US012768307B2

(12) United States Patent
Palmer

(10) Patent No.: US 12,768,307 B2
(45) Date of Patent: Oct. 20, 2026

(54) HYDROGEN FUEL DELIVERY SYSTEM

(71) Applicant: ROLLS-ROYCE plc, London (GB)

(72) Inventor: Chloe J. Palmer, Derby (GB)

(73) Assignee: Rolls-Royce plc, London (GB)

( * ) Notice: Subject to any disclaimer, the term of this patent is extended or adjusted under 35 U.S.C. 154(b) by 72 days.

(21) Appl. No.: 18/618,401

(22) Filed: Mar. 27, 2024

(65) Prior Publication Data

US 2025/0223931 A1 Jul. 10, 2025

(30) Foreign Application Priority Data

Mar. 28, 2023 (GB) ...................................... 2304480

(51) Int. Cl.
*F02C 9/46* (2006.01)
*F02C 7/224* (2006.01)
*F02C 7/232* (2006.01)

(52) U.S. Cl.
CPC ................ *F02C 9/46* (2013.01); *F02C 7/224* (2013.01); *F02C 7/232* (2013.01); *F05D 2260/605* (2013.01)

(58) Field of Classification Search
CPC .. F02C 9/46; F02C 7/224; F02C 7/232; F05D 2260/605
See application file for complete search history.

(56) References Cited

U.S. PATENT DOCUMENTS 5,203,296 A * 4/1993 Hart ........................ F23D 14/82 431/346
5,827,950 A * 10/1998 Woodbury ............. F23N 5/242 73/40.5 R
6,698,522 B1 * 3/2004 Alhamad ................ F23D 14/82 122/504
12,065,270 B1 * 8/2024 Allison ..................... F02K 9/48
2013/0055715 A1 * 3/2013 Engesser ................. F02C 7/232 60/645
2022/0349343 A1 11/2022 Durocher
2023/0092811 A1 * 3/2023 Palmer ...................... F02C 3/22 60/39.281
2023/0366353 A1 * 11/2023 Miller ....................... F02C 7/25

FOREIGN PATENT DOCUMENTS

EP 4086518 A1 11/2022
EP 4147978 A1 3/2023

OTHER PUBLICATIONS

Spell "When the power goes out: Redundancy is key with firefighting technology" 2000 https://www.firerescue1.com/fire-products/technology/articles/when-the-power-goes-out-redundancy-is-key-with-firefighting-technology-uPpHq0STiPRbaM4U/ (Year: 2000).*
European search report dated Jul. 16, 2024, issued in EP Patent Application No. 24160180.6.
Great Britain search report dated Nov. 28, 2023, issued in GB Patent Application No. 2304480.3.

* cited by examiner

*Primary Examiner* — Ted Kim

(57) ABSTRACT

A fuel delivery system for a gas turbine engine comprises a fuel delivery line for connection between a fuel tank and a combustor of the gas turbine engine and configured to deliver a gaseous fuel in use. The fuel delivery system further includes a fuel vent line arranged to connect combustor and fuel delivery line to a fuel vent outlet. The fuel delivery line comprises a fuel delivery valve, the fuel vent line comprises a fuel vent valve, and a flame arrestor is provided between the combustor and the fuel vent outlet.

8 Claims, 6 Drawing Sheets

HYDROGEN FUEL DELIVERY SYSTEM

CROSS-REFERENCE TO RELATED APPLICATIONS

This specification is based upon and claims the benefit of priority from United Kingdom Patent Application No. 2304480.3, filed on Mar. 28, 2023, the entire contents of which is incorporated by reference.

BACKGROUND

Technical Field

This disclosure relates to fuel delivery for gas turbine engines.

Description of the Related Art

Hydrogen is becoming increasingly attractive as a fuel for combustion engines, particularly gas turbines. Gaseous hydrogen derived from fossil fuels is already successfully used in electricity production, for example. However, the use of hydrogen as a fuel in aero gas turbines is particularly challenging. In particular, the fuel system must guarantee safe operation in all circumstances, particularly when stopping the engine in the event of an emergency.

SUMMARY

The invention is directed to fuel delivery systems for a gas turbine engine, gas turbine engines including such a fuel delivery system, and associated methods.

In a first aspect, one such fuel delivery system comprises:

a fuel delivery line for connection between a fuel tank and a combustor of a gas turbine engine, the fuel delivery line configured to deliver a gaseous fuel in use;

a fuel vent line arranged to connect the combustor and fuel delivery line to a fuel vent outlet; wherein the fuel delivery line comprises a fuel delivery valve;

the fuel vent line comprises a fuel vent valve; and a flame arrestor is provided between the combustor and the fuel vent outlet.

It has been found, during an emergency shutdown of the engine, it may be necessary to vent gaseous fuel in the fuel system to rapidly purge fuel from the system, and thereby prevent additional fuel from reaching the combustor. Additionally, it has been found that during such a shutdown, gas flow may temporarily reverse direction within the fuel lines, with high pressure, high temperature air from the combustion system entering the fuel lines, and mixing with fuel within the fuel lines. Such a mixture may be combustible. As such, the invention provides a means to both vent fuel from the fuel system to prevent delivery to the combustor to rapidly shutdown the engine in an emergency, and prevent any fire from spreading to other parts of the engine.

In an embodiment, the fuel delivery system is arranged to deliver hydrogen fuel. In an embodiment, the fuel tank is configured to store a cryogenic liquid fuel.

In an embodiment, the fuel vent line is connected to the fuel delivery line at a connection point between the combustor and the fuel delivery valve. Advantageously, only a single fuel line connection is required at the combustor.

In an embodiment, the flame arrestor is provided in the fuel vent line. advantageously, fuel flow does not flow through the flame arrestor during normal operation, thereby reducing flow restriction and reducing pumping losses during normal operation. In an alternative embodiment, the flame arrestor may be located in the fuel delivery line upstream in normal flow direction of the connection point, or may be located at the connection point coupling the fuel delivery line to the fuel vent line.

In an embodiment, the flame arrestor is provided upstream of the fuel vent valve. Advantageously, the fuel vent valve is protected from the heat of combustion of the fuel, thereby ensuring reliable operation of the fuel vent valve.

In an embodiment, the flame arrestor comprises a plurality of channels configured to reduce the temperature of the flame front to below its auto-ignition temperature.

In an embodiment, where the fuel tank is configured to store a cryogenic liquid fuel, the fuel delivery system further comprises a pre-heater upstream of the fuel delivery valve configured to vapourise liquid cryogenic fuel for delivery via the fuel delivery line.

In an embodiment, the fuel delivery system comprises a controller configured to control the fuel delivery valve and fuel vent valve in accordance with a shutdown schedule.

The controller may be configured to operate the valves in accordance with the shutdown schedule on detection of an engine emergency, such as a shaft break or turbine failure.

In an embodiment, the emergency shutdown schedule comprises closing the fuel delivery valve to shutoff fuel flow through the fuel delivery line to the combustor, and opening the vent valve to vent fuel from the fuel vent outlet. Advantageously, fuel is shutoff from the engine and vented automatically in the event of an emergency, in a manner which is safe, and avoids flames from reaching upstream portions of the fuel system.

In second aspect, there is provided a gas turbine engine comprising a fuel delivery system according to the first aspect.

In another aspect, there is provided an aircraft comprising a gas turbine engine according to the second aspect.

In a third aspect, there is provided a method of operating the gas turbine engine fuel delivery system of the first aspect, comprising:

detecting an engine emergency requiring an engine shutdown;

by a controller, closing the fuel delivery valve, and opening the fuel vent valve.

BRIEF DESCRIPTION OF THE DRAWINGS

Embodiments will now be described by way of example only with reference to the accompanying drawings, which are purely schematic and not to scale, and in which.

DETAILED DESCRIPTION

The embodiments disclosed herein are described in the context of a hydrogen-fuelled aero gas turbine, but it should be appreciated that the principles disclosed herein may be applied in other applications, for example ground-based gas turbines for energy production or in marine applications.

FIG. 1

Figure 1:
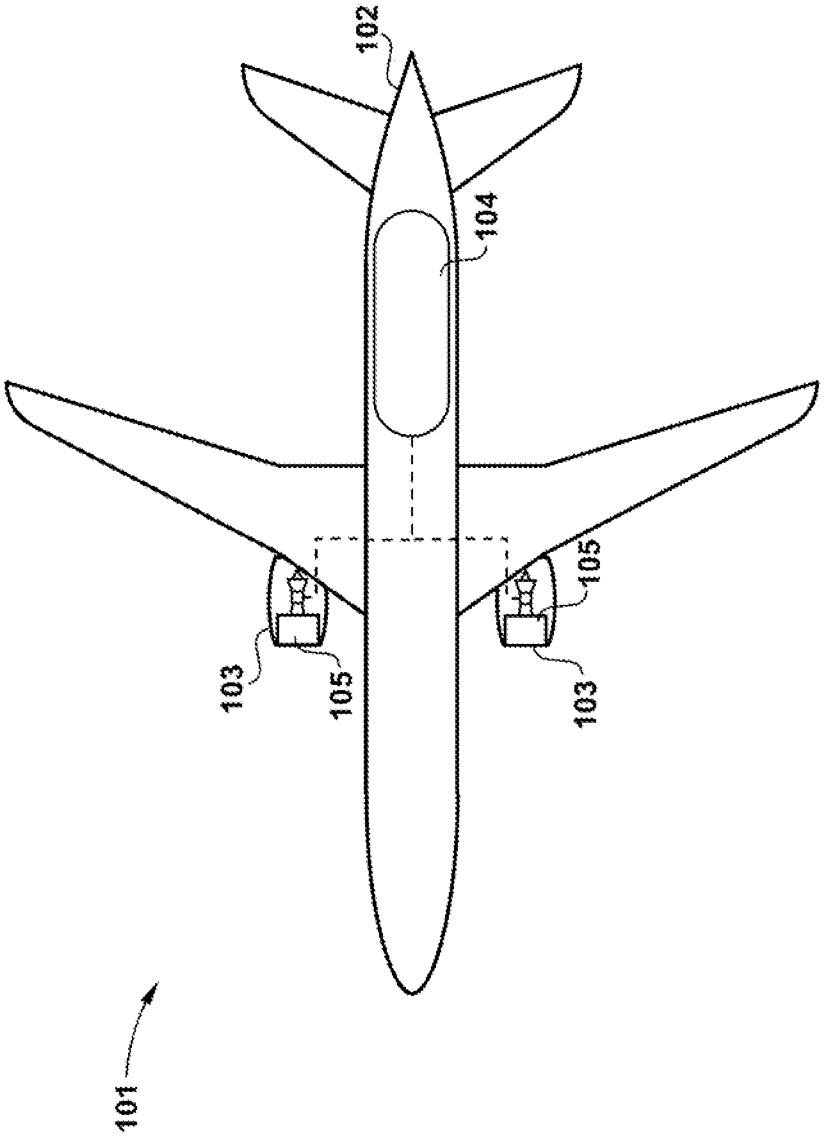
FIG. 1 shows an example hydrogen-fuelled airliner comprising hydrogen-fuelled turbofan engines.

A hydrogen-fuelled airliner is illustrated in FIG. 1. In this example, the airliner 101 is of substantially conventional tube-and-wing twinjet configuration with a central fuselage 102 and substantially identical underwing-mounted turbofan engines 103. The turbofan engines 103 may, for example, be geared turbofan engines.

A fuel tank 104 is located in the fuselage 102 for storing fuel such as hydrogen fuel. In other embodiments, the fuel could comprise another gaseous fuel such as methane. The fuel is typically stored as a cryogenic liquid or in a supercritical state. A fuel delivery system connects the tank 104 with core gas turbines 105 in the turbofan engines 103. The fuel delivery system will be described further with reference to FIGS. 2 and 3. In the present embodiment, the fuel tank 104 is a cryogenic fuel tank that stores the hydrogen fuel in a liquid state. For example, the hydrogen fuel could be stored at 20 kelvin at 1 bar pressure, or 26K at 5 bar pressure. The hydrogen fuel may be pressurised to a pressure of from around 1 bar to around 5 bar, for example around 2 bar. It will be understood however that in other embodiments, the hydrogen fuel may be stored in a gaseous or supercritical state.

FIG. 2

Figure 2:
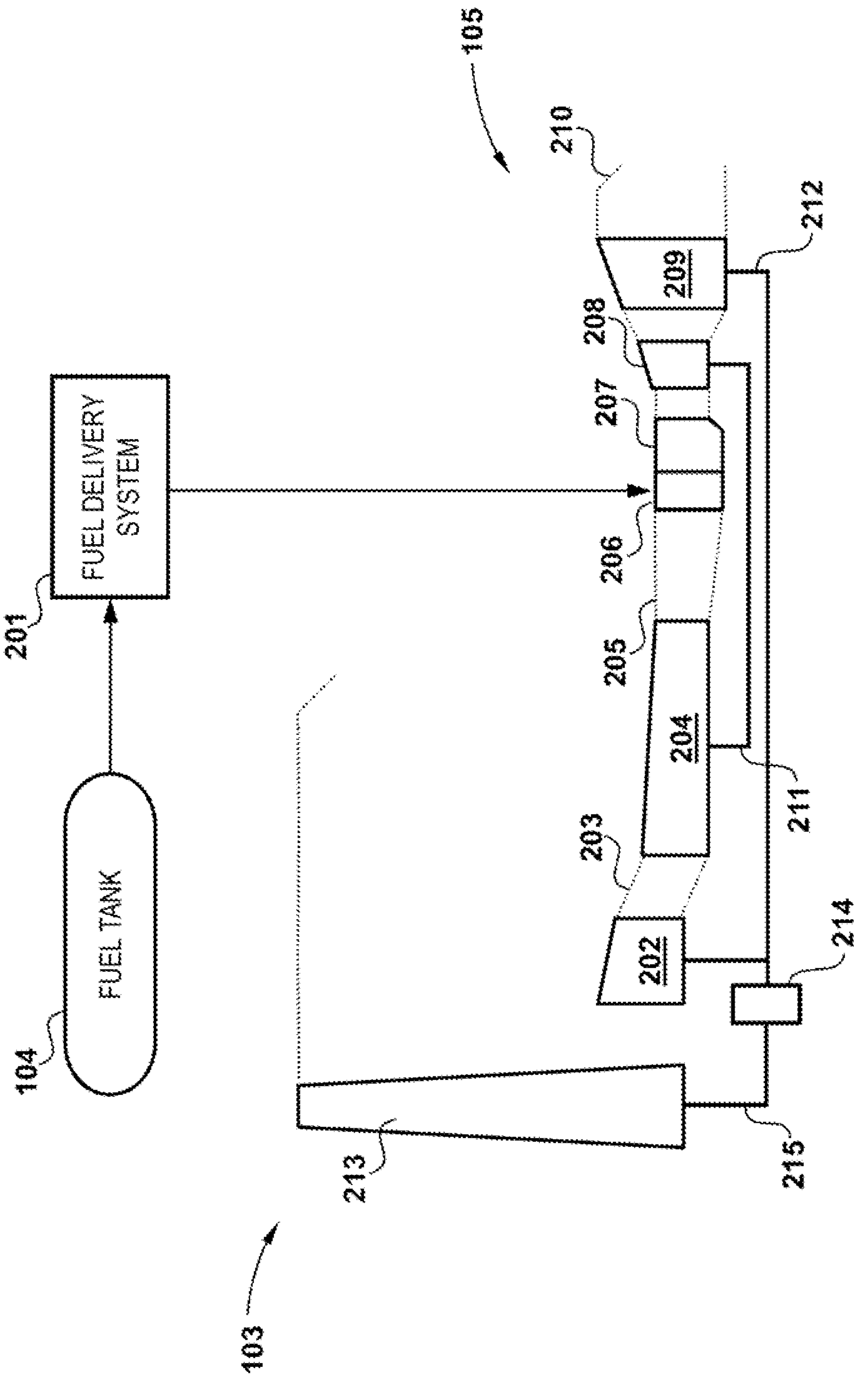
FIG. 2 shows one of the turbofan engines of FIG. 1.

A schematic block diagram illustrating the flow of hydrogen fuel to one of the engines 103 is shown in FIG. 2. Hydrogen fuel is obtained from the fuel tank 104 by a fuel delivery system 201 and is supplied to one of the core gas turbines 105. Only one of the gas turbines is shown for clarity.

The core gas turbine 105 comprises, in axial flow series, a low-pressure compressor 202, an interstage duct 203, a high-pressure compressor 204, a diffuser 205, a fuel injection system 206, a combustor 207, a high-pressure turbine 208, a low-pressure turbine 209, and a core nozzle 210. The fuel injection system 206 may be a lean direct fuel injection system. The high-pressure compressor 204 is driven by the high-pressure turbine 208 via a first shaft 211 and the low-pressure compressor 202 is driven by the low-pressure turbine 209 via a second shaft 212. In alternative examples, the gas turbine 105 may comprise more than two shafts.

In a geared turbofan engine such as in the present example, the low-pressure turbine 209 also drives a fan 213 via a reduction gearbox 214. The reduction gearbox 214 receives an input drive from the second shaft 212 and provides an output drive to the fan 213 via a fan shaft 215. The reduction gearbox 214 may be an epicyclic gearbox, which may be of planetary, star or compound configuration. In further alternatives, the reduction gearbox 214 may be a layshaft-type reduction gearbox or another type of reduction gearbox. It will be appreciated that the principles disclosed herein may be applied to a direct-drive type turbofan engine, i.e. in which there is no reduction gearbox between the low-pressure turbine 209 and the fan 213, and/or to engines with different numbers of spools, for example three spools.

FIG. 3

Figure 3:
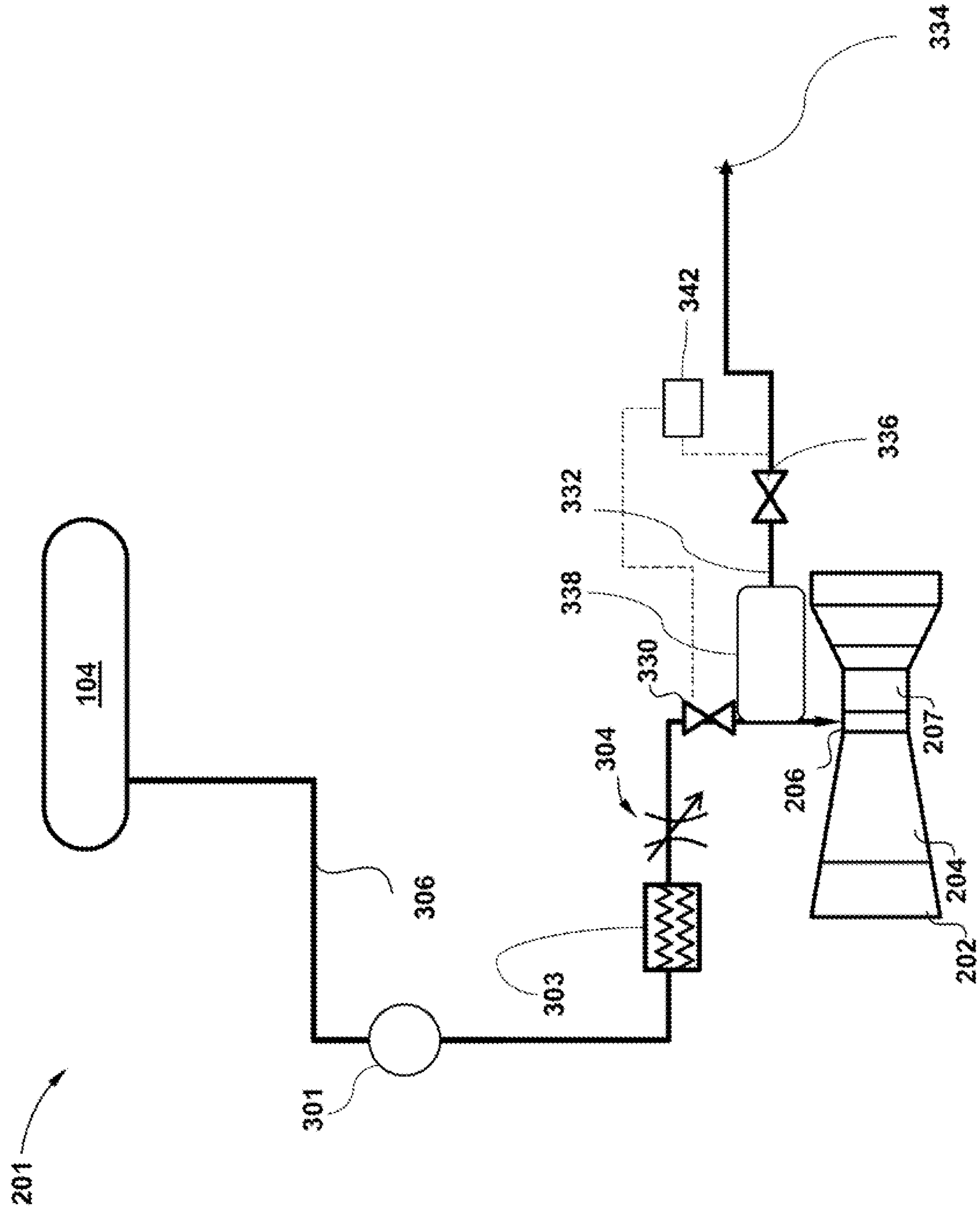
FIG. 3 is a block diagram of the fuel delivery system for the engine of FIG. 2.

In operation, the fuel delivery system 201 is configured to obtain hydrogen fuel from the fuel tank 104 and provide the fuel to the fuel injection system 206, and then to the combustor 207. FIG. 3 is a block diagram illustrating the fuel delivery system 201 in greater detail. The fuel delivery system 201 comprises a pump 301, a heater 303 for heating the hydrogen fuel to an appropriate temperature for metering in a metering device 304 prior to injection by the fuel injection system 206 via a fuel delivery line 306.

During normal operation, flow through the fuel delivery system to the fuel injection system 206 is controlled by operation of the fuel pump 301 and the fuel metering device 304. However, in an emergency, additional fuel control is required.

There are a number of situations where a prompt emergency shutdown may be required. For example, in the event of a breakage of one of more shaft 211, 212, 215, the turbines 207, 208 may be uncoupled from their load. In such an event, the turbines may rapidly overspeed and fail, which may result in a catastrophic and potentially dangerous failure of the whole engine 103. Other failure events which require a prompt shutdown may include a turbine disc burst.

In such a situation, the engine must be shutdown immediately. This is accomplished by providing a fast acting fuel delivery line shutoff valve 330, which is configured to rapidly close to cease flow through the fuel delivery line. The shutoff valve is of conventional construction as would be understood by the skilled person. However, since the fuel comprises a compressible gas, the gaseous fuel in the delivery fuel line 306 downstream of the shutoff valve 330 may continue to flow into the combustor for a time, thereby delaying shutdown. Furthermore, as the pressure in the fuel delivery line 306 downstream of the shutoff valve 330 falls, pressure in the combustor 206 is maintained at a high level by continued operation of the compressors 202, 204 for a time. As such, the pressure differential between the fuel delivery line 306 and combustor 206 may be reversed for a time, such that flow is also reversed. In such circumstances, hot, oxygenated gases from the combustor may flow into the fuel line 306 where they may auto-ignite due to the high temperature and presence of gaseous fuel in the fuel delivery line 306.

The present disclosure solves this problem by the provision of a fuel vent line 332. The fuel vent line 332 is connected between the combustor 206 and a fuel vent outlet 334, which vents fuel and hot combustion gases to an external low pressure sink, such as bypass airflow.

The vent fuel line 332 is typically connected to the fuel delivery line 306 at a connection point 442 located on the fuel delivery line 306 between the fuel delivery line shutoff valve 330 and combustor 206. This allows the fuel vent line 332 to directly vent fuel in the fuel delivery line as well as the combustor 206. In alternative embodiments, the fuel vent line may be separately connected directly to the combustor 206.

The fuel vent line 332 includes a vent line valve 336 which is configured to control flow through the fuel vent line 332, to prevent fuel from being vented during normal operation. The valve 336 is configured to operate in either a closed position, in which flow is prevented, and an open position in which flow is permitted through the valve 336.

The fuel delivery system comprises a controller 342 configured to control the fuel delivery shutoff valve 330 and vent valve 336 in the event of an emergency.

During operation in an emergency shutdown, burning fuel may be present in the fuel vent line 332. It is desirable to prevent this burning fuel from being expelled from the vent outlet 334, as this could damage downstream components, and cause the fire to spread.

Consequently, the disclosed fuel delivery system comprises a flame arrestor 338 provided in the fuel vent line 332. Preferably, the flame arrestor 338 is provided downstream of the connection to the combustor 206 or fuel delivery line 306, and upstream of the fuel vent line valve 336, to prevent fire damage to the valve 336.

Figure 4:
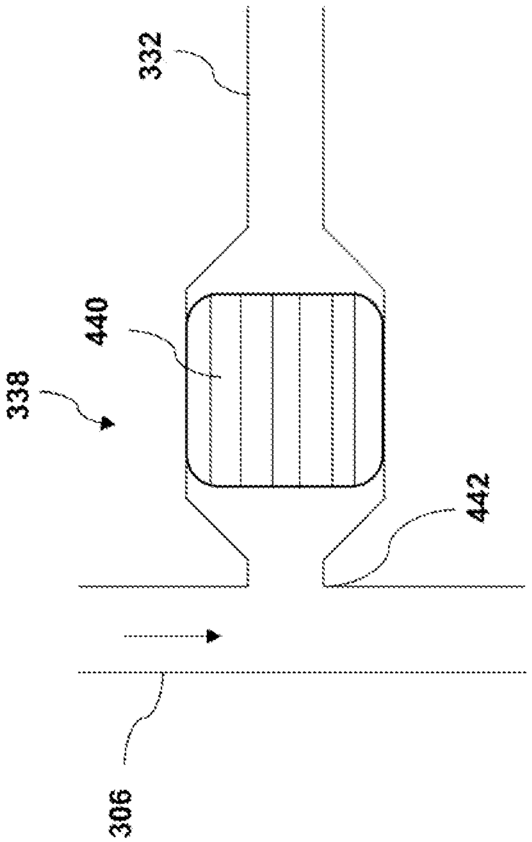
FIG. 4 shows the flame arrestor for the fuel delivery system of FIG. 3.

The flame arrestor 338 is of conventional construction. An example construction is shown in FIG. 4.

FIG. 4

Flame arrestors operate by removing heat from the flame front, thereby extinguishing the flame. The flame arrestor 338 comprises a flame arrestor element 440 comprising a plurality of channels provided within a heat conductive material. The heat conductive material absorbs heat from the hot gases as they pass through, thereby allowing flammable gases to propagate through to the other end of the flame arrestor 338, while preventing flames from passing therethrough. In view of the high pressure and velocity of gasses in the vent line 332, it is desirable to careful design the vent line 332 downstream of the flame arrestor 338 to prevent any sources of ignition in the line. For example, the line 332 downstream of the flame arrestor 338 may have a larger cross-section than the line 332 upstream of the flame arrestor 338, to prevent shocks from forming in the flow, to thereby prevent re-ignition of the flow prior to the flow being exhausted from the outlet 334.

FIG. 5

Figure 5:
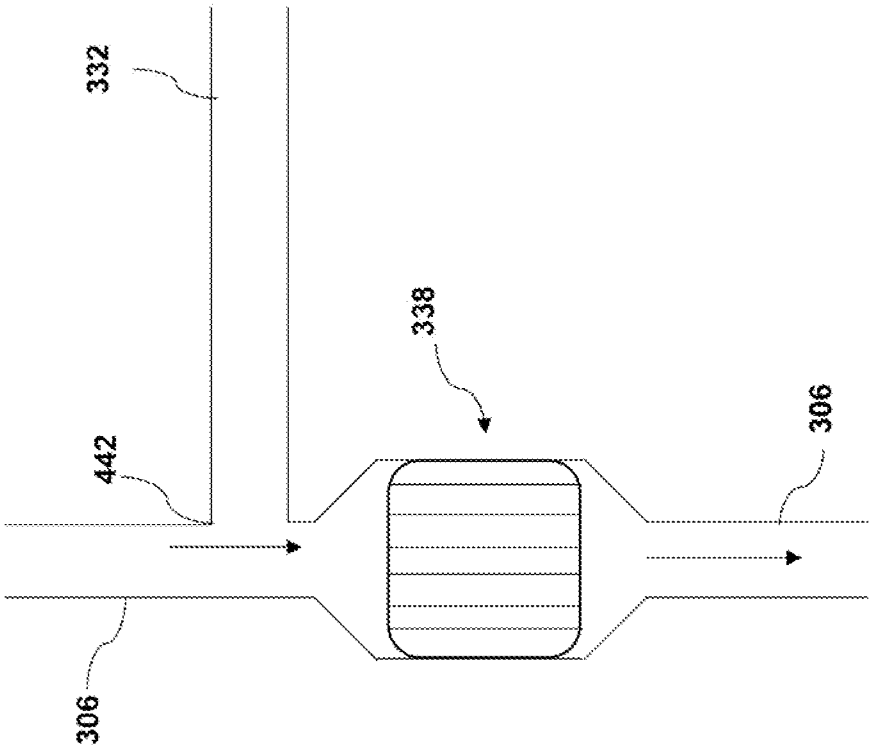
FIG. 5 shows an alternative placement for the flame arrestor of the fuel delivery system.

FIG. 5 shows an alternative positioning for the flame arrestor 338. In the embodiment of FIG. 5, the flame arrestor 338 is provided as part of the fuel delivery line 306, and is provided downstream in normal flow direction (as shown by the arrows) of the connection point 442 and the fuel shutoff valve 330, which connects the fuel delivery line 306 and fuel vent line 332. As such, fuel flows through the flame arrestor 338 during normal operation. This arrangement may permit locating the flame arrestor closer to the combustor 207, thereby reducing the size of the fire should one occur during a shutdown, and also providing additional protection to the fuel shutoff valve 330.

FIG. 6

Figure 6:
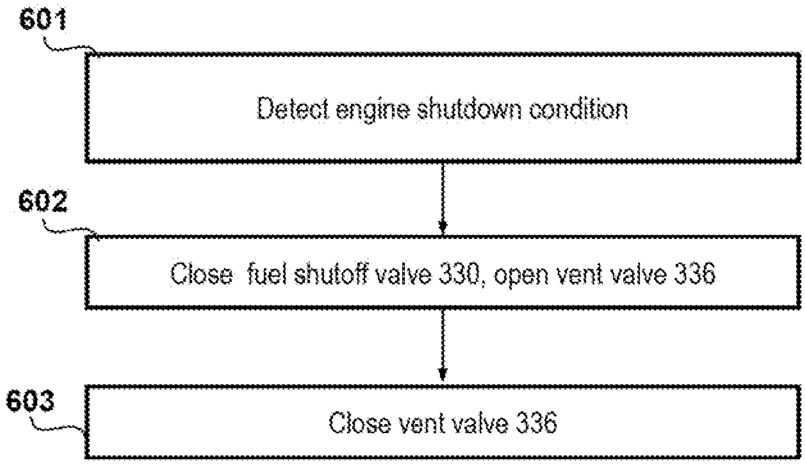
FIG. 6 is a flow diagram of an emergency shutdown procedure for the fuel delivery system of FIG. 3.

FIG. 6 is a flow diagram illustrating a method of operation of the fuel delivery system 201.

In a first step 601, an engine condition requiring an emergency engine shutdown is detected, either by the controller 342, or a separate engine condition monitoring device (not shown). As noted above, such conditions may comprise shaft breaks or turbine disc failures, though it should be noted that other emergency conditions may exist which require an emergency engine shutdown. In one example, the emergency condition comprises a shaft break. The shaft break is detected by a sensor such as shaft speed sensor which determines that one or more engine shaft 211, 212 has exceeded a predetermined speed, which indicates that the shaft has broken. It will be understood that other mechanisms for detection of a shaft break condition could be employed, as will be understood by the skilled person.

In a second step 602, the controller 342 provides a control signal to the fuel delivery line shutoff valve 330 to close, to cease fuel flow from the fuel delivery line 306 to the combustor 207. Simultaneously, the controller 342 provides a control signal to the vent line valve 336 to open, to thereby vent gaseous fuel from the fuel delivery line downstream of the fuel shutoff valve 330. Typically, these actions are conducted simultaneously. However, in some cases, the vent valve (336) may be opened prior to closing the fuel shutoff valve (330) so as to prevent high pressure flammable gases building up in the fuel delivery line 306. As such, fuel flow to the combustor 206 is halted, and gaseous fuel and combustor gasses are vented through the vent line 332, flame arrestor 338, valve 336 and outlet 334, to atmosphere.

In a third step 603, after a short period has elapsed and the gaseous fuel remaining in the fuel lines has been vented, the vent valve 336 is closed, and the engine continues to rundown until full shutdown is achieved.

As such, the disclosed fuel delivery system provides an effective, safe system for the safe shutdown of a hydrogen fuelled gas turbine in the event of an emergency.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein.

The invention claimed is:

1. A fuel delivery system for a gas turbine engine, the fuel delivery system comprising:

a combustor of a gas turbine engine core, the combustor being disposed after a compressor of a gas turbine engine and before a turbine of a gas turbine engine in axial flow series;

a fuel vent outlet;

a fuel delivery line for connection between a fuel tank and the combustor, the fuel delivery line configured to deliver a gaseous fuel in use;

a fuel vent line arranged to connect the combustor and fuel delivery line to the fuel vent outlet; wherein the fuel delivery line comprises a fuel delivery valve, wherein the fuel vent line is connected to the fuel delivery line at a connection point between the combustor and the fuel delivery valve, the fuel delivery line absent an additional valve between the fuel delivery valve and the combustor;

the fuel vent line comprises a fuel vent valve;

a flame arrestor is provided in fuel flow in the fuel vent line between the combustor and the fuel vent outlet; and wherein the fuel delivery system comprises a controller configured to control the fuel delivery valve and fuel vent valve in accordance with an emergency shutdown schedule upon detection of an engine emergency, such as a shaft break or turbine failure; and wherein the emergency shutdown schedule comprises closing the fuel delivery valve to shutoff fuel flow through the fuel delivery line to the combustor, and opening the vent valve to vent fuel and hot combustion gas from the fuel vent outlet.

2. A fuel delivery system according to claim 1, wherein the fuel delivery system is arranged to deliver hydrogen fuel.

3. A fuel delivery system according to claim 2, wherein the fuel tank is configured to store a cryogenic liquid fuel.

4. A fuel delivery system according to claim 3, wherein the fuel delivery system further comprises a pre-heater upstream of the fuel delivery valve in normal fuel flow direction configured to gasify liquid cryogenic fuel for delivery via the fuel delivery line.

5. A fuel delivery system according to claim 1, wherein the flame arrestor is provided upstream of the fuel vent valve in fuel flow direction when venting.

6. A fuel delivery system according to claim 1, wherein the flame arrestor comprises a plurality of channels configured to reduce the temperature of the flame front to below its auto-ignition temperature.

7. A gas turbine engine comprising a fuel delivery system according to claim 1.

8. A method of operating the gas turbine engine fuel delivery system of claim 1.

* * * * *